A. A. KENT.
MEASURING GAGE.
APPLICATION FILED MAR. 23, 1908.
922,152.
Patented May 18, 1909.
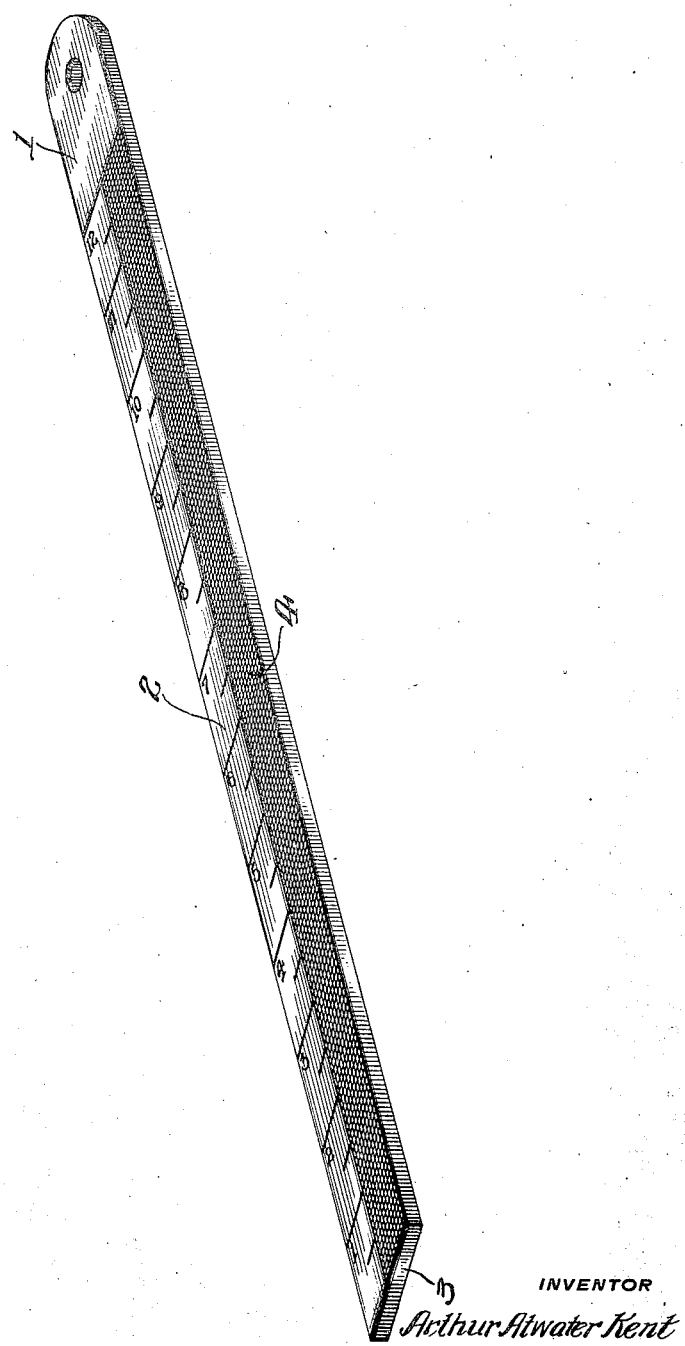
WITNESSES
INVENTOR
Arthur Atwater Kent
BY
ATTORNEY

UNITED STATES PATENT OFFICE.

ARTHUR ATWATER KENT, OF PHILADELPHIA, PENNSYLVANIA.

MEASURING-GAGE.

No. 922,152.  Specification of Letters Patent.  Patented May 18, 1909.

Application filed March 23, 1908. Serial No. 422,799.

*To all whom it may concern:*

Be it known that I, ARTHUR ATWATER KENT, a citizen of the United States, and a resident of Philadelphia, county of Philadelphia, Pennsylvania, have invented certain new and useful Improvements in Measuring-Gages, of which the following is a full, clear, and exact disclosure.

My invention relates to measuring gages, and particularly to those gages or ullage-rods used to ascertain the amount of liquid in a receptacle, and more specifically, to a gage or scale particularly adapted to measure the amount of gasolene, benzin, naphtha, naphthalene, kerosene or similar liquids in a tank.

As is well known, on account of the shape and location of the gasolene tank of an automobile, it is very difficult to ascertain how much gasolene there is at any particular time in the tank and the object of my invention is to provide a gage or scale which will easily and accurately enable the user to tell at any time how many inches or centimeters of gasolene or similar fluid there is in the tank.

A further object of my invention is to make a gage of the character above described which will resist and not be affected by the action of gasolene or similar fluids, and to provide it with a surface which will change its appearance when immersed in gasolene of similar fluids so that the immersed part of the gage will present a different appearance from that part which has not been immersed.

A further object of my invention is to provide suitable graduations adjacent the changeable surface so that the depth of the gasolene in the tank can be ascertained at once by the line of demarcation between the immersed and unimmersed surfaces.

Other objects of my invention will appear in specification and claims below.

In the accompanying drawing forming a part of this specification is illustrated in a perspective view the preferred form of my invention.

A suitable rod or strip 1, of wood or any other material to which a paint or coating which will resist the action of gasolene or similar fluids, will adhere, is provided with a stamped, pressed, printed, or painted graduated surface 2, beginning from one end 3, and extending for a suitable distance toward the opposite end of the strip. I prefer to make the graduated surface 2, of a light color and to form the graduations thereon in a contrasting color as illustrated in the drawing. Adjacent one side of the graduated surface of the gage and extending substantially the whole length of the same, I provide a contrasting surface 4, as by painting a strip or stripe of contrasting color. This surface may be made of a paint or coating which will resist the action of gasolene and I preferably make this strip or stripe of a material which is normally of a dull appearance, but which will "wet" with gasolene or similar fluids, and when "wet", will present a shining or glossy appearance. This surface is one to which the gasolene or similar fluid will adhere, but up which the fluid will not creep to any great extent when the stick or gage is partly immersed in a body of the liquid. I have found that when the surface is painted with dull black lacquer all the above requirements are fulfilled; that is to say, the gasolene or similar fluid, will not attack the lacquer or affect it injuriously in any way, while at the same time the normally dull black surface will become bright or glossy when immersed in gasolene, thus forming a very sharp clean line of demarcation between the wet and the unwet surfaces.

To ascertain the amount of gasolene or similar material in the tank, it is merely necessary to immerse the gage in the tank until the end 3, touches the bottom and to then withdraw it. The depth of the gasolene in the tank will plainly show upon the surface of the gage, that part which was immersed presenting a shining or glossy appearance, and the part not immersed having the dull black appearance. The line of demarcation between these two surfaces will be very plain and the scale or graduations adjacent said surfaces will show exactly how many inches or centimeters of gasolene there are in the tank.

While I have described my invention as particularly adapted for measuring gasolene, I do not wish to be construed as being strictly limited to the use to which my invention may be put, since it contemplates the use of any surface which will not be affected by gasolene, benzin, naphtha, naphthalene, kerosene or similar fluids and which will change in a marked manner its appearance upon being wet with the liquid, and the providing adjacent said surface of a suitable scale for determining the depth of liquid in the receptacle. Nor do I wish to be construed as limiting to the precise form or arrangement above described since any embodiment of the same is fully within the aim and purpose of my invention so long as it falls within the scope of the appended claims.

Having thus described my invention, what I claim and desire to protect by Letters Patent of the United States is:

1. A gage having a graduated scale extending from one end thereof toward the opposite end and the surface of said gage adjacent said scale being coated with a dull black lacquer.

2. A gage having a graduated scale extending from one end thereof toward the opposite side, the surface of said gage adjacent said scale being coated with a material which resists the action of gasolene or similar fluids and normally presents a dull appearance, and when wet with the said liquid presents a shining glossy appearance.

3. A gage having a graduated scale extending from one end thereof toward the opposite end and a stripe of dull black lacquer adjacent said scale and extending the length thereof.

4. A gage having a graduated scale extending lengthwise of said gage, and adjacent said scale a dark, matte surface of a material which, when wet with gasolene or similar fluids, changes to a dark, glossy surface, whereby, when the gage is partly immersed in said liquid, the place to which it has been immersed will plainly show opposite the scale as the line between the matte and the glossy surface.

In witness whereof I have hereunto set my hand this twentieth day of March A. D., 1908.

ARTHUR ATWATER KENT.

Witnesses:
WALTER J. LITTLE,
G. BRINTON LUCAS.